Patented Aug. 1, 1933

1,920,306

UNITED STATES PATENT OFFICE 1,920,306

PROCESS OF PREPARING CELLULOSE ESTERS

Joseph F. Haskins, Kenmore, N. Y., assignor to DuPont Rayon Company, New York, N. Y., a Corporation of Delaware No Drawing. Application January 22, 1930
Serial No. 422,547

10 Claims. (Cl. 260—101.)

This invention relates to the art of cellulose esters, and more particularly to an improved process of producing them.

In recent years cellulose esters have become very important in connection with plastics, lacquers, threads, filaments, films and similar products, and a large number of processes have been suggested for preparing them.

In the usual method of preparing cellulose acetate, a cellulose, which may or may not have been degraded to form such products as hydrocellulose, or oxycellulose, is treated with a material capable of forming the esters. The common materials are acetic anhydride and acetyl chloride. This reaction is ordinarily carried out in the presence of a third component, which may play an active part in the reaction or which may be present merely as a diluent for the reacting constituents. In the case of cellulose acetate, the common solvent is acetic acid.

The use of acetyl chloride has not reached any commercial importance, however, because of the serious degrading effect of hydrochloric acid, which is a by-product of the interaction of acetyl chloride on cellulose. Consequently acetic anhydride has been the only practical acetylating agent.

It has been found, however, that the reaction of acetic anhydride on cellulose in the presence of glacial acetic acid does not proceed at a sufficiently rapid rate to give interesting results under any reasonable conditions. If the temperature, for example, is elevated sufficiently to produce a reasonable speed of reaction, it is found that the cellulose acetate is seriously degraded and not suitable for use. On the other hand, if the cellulose used for this reaction is seriously degraded in order to increase the activity of the acetic anhydride, the resulting product has little or no commercial possibility. In view of this, a large number of substances have been proposed to stimulate this reaction. These compounds are conveniently called catalysts and the most important one is sulphuric acid. Experiments have shown conclusively that sulphuric acid promotes the acetylation of cotton by acetic anhydride and that the reaction can be completed at relatively low temperatures within a reasonable time. In fact it is found that a low temperature must be used in order to minimize the degrading influence of the sulphuric acid on the cellulose and the resulting cellulose acetate.

Many proposals have been made in regard to means of reducing the bad effects of sulphuric acid, but so far as I know none of them have attained commercial success. Such compounds as pyridine sulphate, pyridine sulphuric anhydride, hydroxylamine sulphate, hydrazine sulphate, methylene sulphate, ferrous sulphate, sodium bisulphate and other acid sulphates, and sulphonic acids have been proposed, but it is generally admitted that these compounds are merely modified sulphuric acids and that they depend, for their activity, on free sulphuric acid adhering to, or to free sulphuric acid formed by interaction with, the compounds, or as a result of a spontaneous decomposition. The success of these compounds apparently depends on the rate at which the sulphuric acid is freed, and so far as I know none of these modified sulphuric acids have been used commercially.

Hydrochloric acid and similar volatile mineral acids have also been proposed as catalysts for the reaction of acetic anhydride on cellulose, and I have found that they do promote the reaction although they also stimulate a degradation of the cellulose and apparently because of this have not found favor.

I have discovered that hydrochloric acid may be more conveniently modified than can sulfuric acid, and that these modified hydrochloric acids, when used in acid or neutral solution, cause the reaction to proceed satisfactorily and form substantially undegraded cellulose esters.

It is therefore an object of this invention to provide a new process of making cellulose esters.

It is another object of this invention to produce esters by using catalysts which are capable of promoting the reaction between an acid anhydride and a substantially undegraded cellulose in acid or neutral solution so that the reaction can be accomplished under convenient conditions, and so that the resulting product has commercial possibilities.

With the above and other objects in view, which will be apparent as the description proceeds, I have set forth my invention in the following specification and have included the following examples by way of illustration and not as a limitation.

Example 1

To 16.2 grams of cotton linters pulp is added 4 grams of ammonium chloride, 68 cc. of glacial acetic acid and 60 cc. of acetic anhydride. The mixture is heated in an oil bath kept at such a temperature that slow refluxing takes place. (e. g. about 120° C.) At the end of 2 hours the cellulose is completely in solution, and the solution is then poured slowly into water, where it coagulates. The coagulated cellulose triacetate is washed several times by decantation and dried. The product is soluble in chloroform.

Example 2

1 part by weight of monoethyl cellulose, 3 parts by weight of acetic anhydride, 3 parts by weight of pyridine hydrochloride and 14 parts by weight of chlorobenzene are mixed and heated for about 2½ hours in a bath kept at 130° C., or at such a temperature that the volatile liquids reflux slowly. The solution is poured slowly with stirring into alcohol, extracted with alcohol, and dried at 100° C. The product is a monoethyl cellulose diacetate, and is soluble in chloroform.

Example 3

To 1 part by weight of cotton linters pulp is added a mixture of 3⅓ parts by weight of pyridine hydrochloride and 3⅓ parts by weight of acetic anhydride in 10 parts by weight of amyl acetate. The mixture is placed in a flask attached to a reflux condenser and heated to such a temperature that slow refluxing takes place (i. e., about 150° C.) for 1½ hours. The cellulose is markedly swelled but retains its fibrous form and does not go into solution. The reaction mixture is pressed or squeezed out of the cellulose acetate which is then extracted with alcohol and dried. The product shows on analysis a content of over 2 acetyl groups for each 6 carbon atoms of the cellulose.

While cotton linters pulp and monoethyl cellulose are specifically disclosed in the above examples, it is obvious that other sources of cellulose, such as sulphite wood pulp or cotton hull fibers, may also be used. While I prefer to use a substantially undegraded cellulose, such as cotton linters, without any pretreatment or degredation, for special purposes it may be desirable to partially degrade the cellulose or to use hydrocellulose or oxycellulose, and the invention contemplates such use. I may also use any of the lower esters or ethers of cellulose, such as the monoethyl ether of cellulose, in which cases I secure mixed esters or ether-esters.

Although the above examples are limited to the production of cellulose triacetate and monoethyl cellulose diacetate, I do not desire to be limited thereto since other esters, such as cellulose propionate, cellulose butyrate, cellulose benzoate, cellulose stearate, cellulose palmitate, etc., may be prepared in accordance with the process disclosed herein.

In Examples 1 and 2 the time of heating has been stated as 2 or 2½ hours. This statement of time is not a limitation, however, and excellent results can be obtained under certain circumstances by heating for a considerably less period of time, for instance 1 hour, or for a considerably greater period of time, for instance 4 hours. The time of reaction, of course, affects the properties of the final product.

The products of my reaction are substantially undegraded cellulose esters as is indicated by their insolubility in common solvents. In many cases I secure the cellulose triesters, such as cellulose triacetate, as shown by chemical analysis. I do not of course secure mixed esters containing sulphuric acid because of the absence of sulphuric acid in my mixture, and so far as I know corresponding mixed esters containing chlorine are not possible Although pyridine hydrochloride and ammonium chloride have been used as the amine salt and the ammonium salt, respectively, of a halogen acid in the above examples, I do not desire to be limited thereto because my invention includes the use as catalyst of compounds composed of the reaction products of ammonia or organic substituted ammonias with a volatile mineral acid, such as hydrochloric or hydrobromic. I believe, although I do not desire to be limited thereby, that the desirable catalyst is one which is capable of maintaining small amounts of halogen acid by spontoneous decomposition or hydrolysis, and preferably according to a reversible reaction. Somewhat higher temperatures are required than those used with sulphuric acid type catalysts.

In the above examples the acid or neutral solution used is acetic acid or chlorobenzene, but other solvents, such as chloroform, may be used.

My products may be used as they are produced according to this invention in the preparation of films, threads, filaments, plastics, lacquers and any other use to which cellulose esters are usually applied. Furthermore, where a different solubility is desired, I may treat my cellulose esters with various materials to alter their solubility.

It will therefore be apparent that I have produced a new and useful process of making cellulose esters which yields cellulose esters of higher quality, that it can be carried out with rapidity, with lower temperatures and with smaller amounts of acid anhydride, and that the temperature, time and concentration of amine salts may be varied to control the solubility, viscosity and purity of the resulting cellulose derivative.

As many apparently widely different embodiments of this invention may be made without departing from the spirit and scope thereof, it is to be understood that I do not limit myself to the specific embodiments thereof except as defined in the appended patent claims.

I claim:

1. The process of making a cellulose ester which comprises heating a compound containing the cellulose nucleus and a reactive OH group with a carboxylic acid anhydride and a catalyst from the group consisting of an ammonium halide and a pyridine hydrohalide in a non-basic solution.

2. The process of claim 1, in which acetic anhydride is used.

3. The process of claim 1, in which pyridine hydrochloride is used.

4. The process of claim 1, in which the heating is carried out at from 100° to 150° C.

5. The process of claim 1, in which the reaction is continued for from 1 to 4 hours.

6. The process of making cellulose acetate, which comprises heating cellulose with acetic anhydride in a non-basic solution in the presence of a pyridine hydrochloride at a temperature of from 100° to 150° C.

7. The process of making a cellulose ester which comprises heating a compound containing a cellulose nucleus and a reactive OH group with a carboxylic acid anhydride and a catalyst from the group consisting of ammonium halides and pyridine hydrohalides in a non-basic solution.

8. The process of claim 7 in which the acid anhydride is acetic anhydride.

9. The process of claim 7 in which pyridine hydrochloride is used.

10. The process of claim 7 in which heating is carried out at a temperature between about 100° C. and about 150° C.

JOSEPH F. HASKINS.